(12) United States Patent
Sakagami et al.

(10) Patent No.: US 6,787,609 B2
(45) Date of Patent: Sep. 7, 2004

(54) SOLID GOLF BALL

(75) Inventors: Seigou Sakagami, Kobe (JP); Satoshi Mano, Kobe (JP)

(73) Assignee: Sumitomo Rubber Industries Limited, Hyogo (JP)

( * ) Notice: Subject to any disclaimer, the term of this patent is extended or adjusted under 35 U.S.C. 154(b) by 0 days.

(21) Appl. No.: 10/146,820

(22) Filed: May 17, 2002

(65) Prior Publication Data

US 2003/0064827 A1 Apr. 3, 2003

(30) Foreign Application Priority Data

May 17, 2001 (JP) ........................................ 2001-147712

(51) Int. Cl.[7] .............................................. A63B 37/06
(52) U.S. Cl. .................... 525/261; 525/274; 524/392; 473/371; 473/372; 473/377
(58) Field of Search ..................... 524/392; 525/261, 525/274; 473/371, 372, 377

(56) References Cited

U.S. PATENT DOCUMENTS

| | | | |
|---|---|---|---|
| 6,315,683 B1 | * | 11/2001 | Yoshida |
| 6,494,793 B1 | * | 12/2002 | Ohama |
| 6,592,470 B2 | | 7/2003 | Watanabe et al. |
| 2003/0064826 A1 | * | 4/2003 | Voorheis |

FOREIGN PATENT DOCUMENTS

| | | |
|---|---|---|
| JP | 2669051 | 7/1997 |
| JP | 10-192446 A | 7/1998 |
| JP | 11-262544 A | 9/1999 |
| JP | 2000-217948 | * 8/2000 |
| JP | 2000-300697 A | 10/2000 |
| JP | 2001-054589 | * 2/2001 |
| JP | 2002-315848 A | 10/2002 |

OTHER PUBLICATIONS

Thain *Science and Golf IV* p. 319–327, Jul. 2002.*

* cited by examiner

*Primary Examiner*—David J. Buttner
(74) *Attorney, Agent, or Firm*—Birch, Stewart, Kolasch & Birch, LLP

(57) ABSTRACT

The present invention provides a solid golf ball which imparts a superior shot feeling to the golfer and exhibits stabilized repulsion performance when it is hit at any head speed.

The solid golf ball of the present invention comprises a core containing at least one layer which is molded by vulcanizing the rubber composition including: (a) a base rubber, (b) a co-crosslinking agent, (c) an organic peroxide, and (d) a bromine-substituted thiophenol compound represented by the formula, or a monovalent or divalent metal salt thereof:

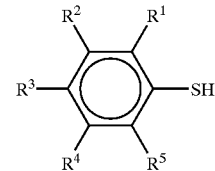

(wherein at least one of $R^1$ to $R^5$ is Br).

15 Claims, 2 Drawing Sheets

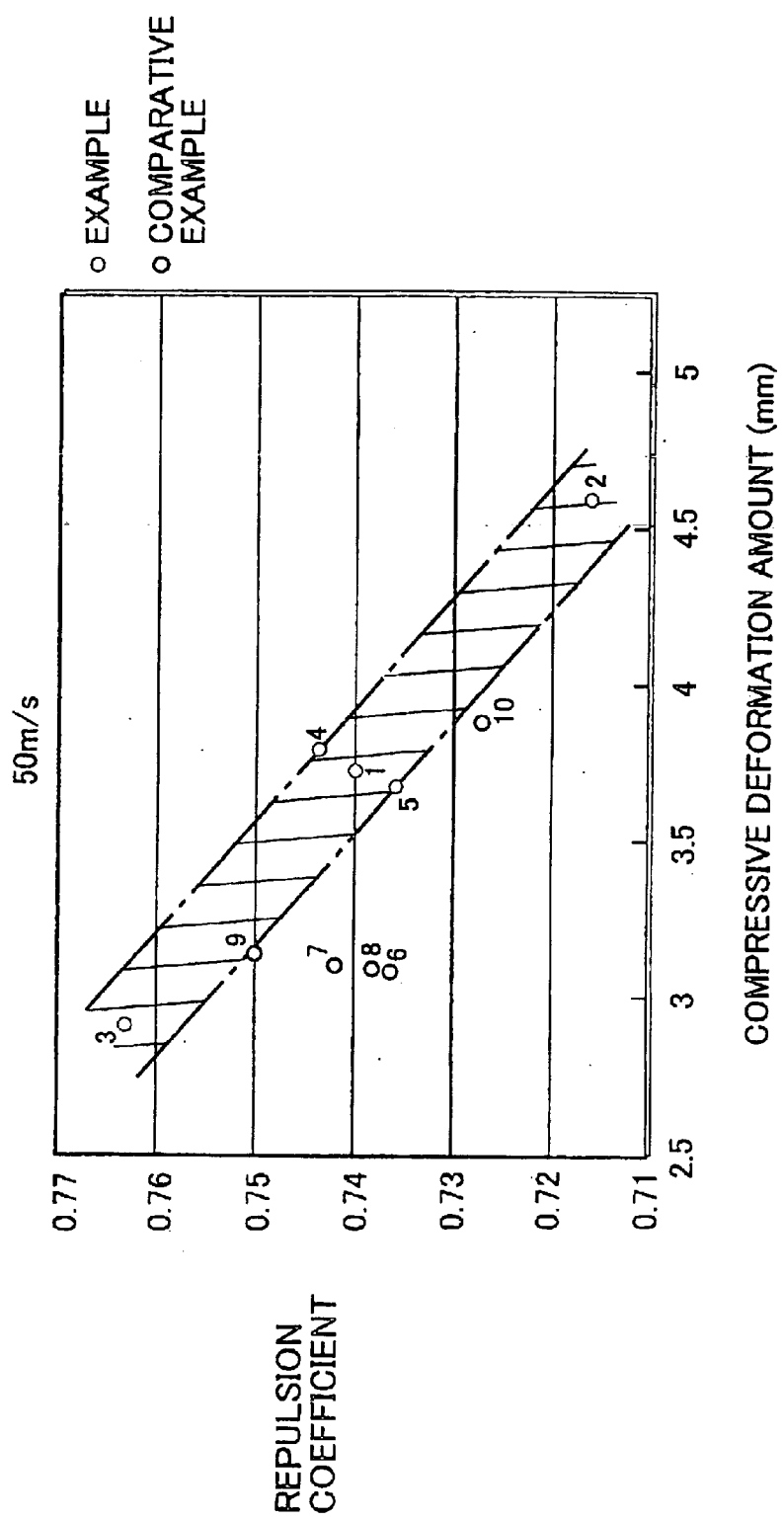

SOLID GOLF BALL

BACKGROUND OF THE INVENTION

1. Field of the Invention

The present invention relates to a solid golf ball having well-balanced properties between repulsion property and shot feeling, irrespective of whether the golf ball is hit at the high head speed or the low head speed.

2. Description of the Related Art

Golf balls are classified into two major groups. The one is the solid golf ball which is excellent in durability and flight distance, and the other is the wound-core golf ball which is excellent in controllability and shot feeling. The former solid golf ball includes a two-piece golf ball comprising a core covered with a cover material, and a multi-layered golf ball having at least one intermediate layer between a core and a cover.

The core of the solid golf ball is usually obtained by vulcanizing-molding a rubber composition which has a formulation of polybutadiene as a base rubber, a metal salt of $\alpha, \beta$-unsaturated carboxylic acid and an organic peroxide. The metal salt of $\alpha, \beta$-unsaturated carboxylic acid serves as a co-crosslinking agent in the rubber composition and is grafted onto the main chain of the polybutadiene by the organic peroxide serving as a free-radical initiator. Since the rubber composition is molded by vulcanization into the core and forms a three-dimensional cross-linking structure therein, the core exhibits moderate hardness and durability. Further, it is known that the solid golf ball having the above core exhibits superior durability and satisfactory repulsion performance and flying performance.

However, the solid golf ball has a problem that it is relatively hard and gives a relatively large impact (a relatively poor shot feeling) to the golfers when it is hit, compared with the conventional wound-core golf ball. Attempts have been made to lower the hardness of the core in order to improve the shot feeling. However, a resulting golf ball has not exhibited a sufficient flight distance due to the lowered repulsion performance, although the shot feeling has been improved. For example, Japanese Patent No. 2669051 discloses that an organic sulfur compound is blended into the core rubber composition in order to improve the flight distance.

In playing golf, the golfer can choose a golf club and the manner of swinging appropriately depending upon the situation of the golf course, but the golfer cannot change a golf ball throughout all the holes as a general rule. For this reason, a golf ball is required to exhibit stable flying performance and repulsion property and impart a favorable shot feeling at any head speed from low speed to high speed.

However, since the repulsion property and shot feeling of the golf ball vary depending on the kind of the organic sulfur compounds formulated in the rubber composition, a golf ball of which the repulsion property is compatible with the shot feeling at any head speed has not been obtained yet.

SUMMARY OF THE INVENTION

The present invention has been achieved in view of such circumstances, and it is an object of the present invention to provide a solid golf ball which exhibits stabilized repulsion performance and gives a superior shot feeling to the golfer when it is hit at any head speed.

According to the present invention, there is provided a solid golf ball comprising a core containing at least one layer, and a cover containing at least one layer and covering the core, wherein the at least one layer of the core is molded by vulcanizing a rubber composition including: (a) a base rubber, (b) a co-crosslinking agent, (c) an organic peroxide, and (d) a bromine-substituted thiophenol compound represented by the following formula, or a monovalent or divalent metal salt thereof:

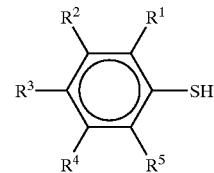

(where at least one of $R^1$ to $R^5$ is Br).

BRIEF DESCRIPTION OF THE DRAWINGS

FIG. 2 is a graph representing the relationship between the compressive deformation amount and the repulsion coefficient when the golf ball is hit at the head speed of 50 m/sec.

DETAILED DESCRIPTION OF THE PREFERRED EMBODIMENTS

Figure 1:
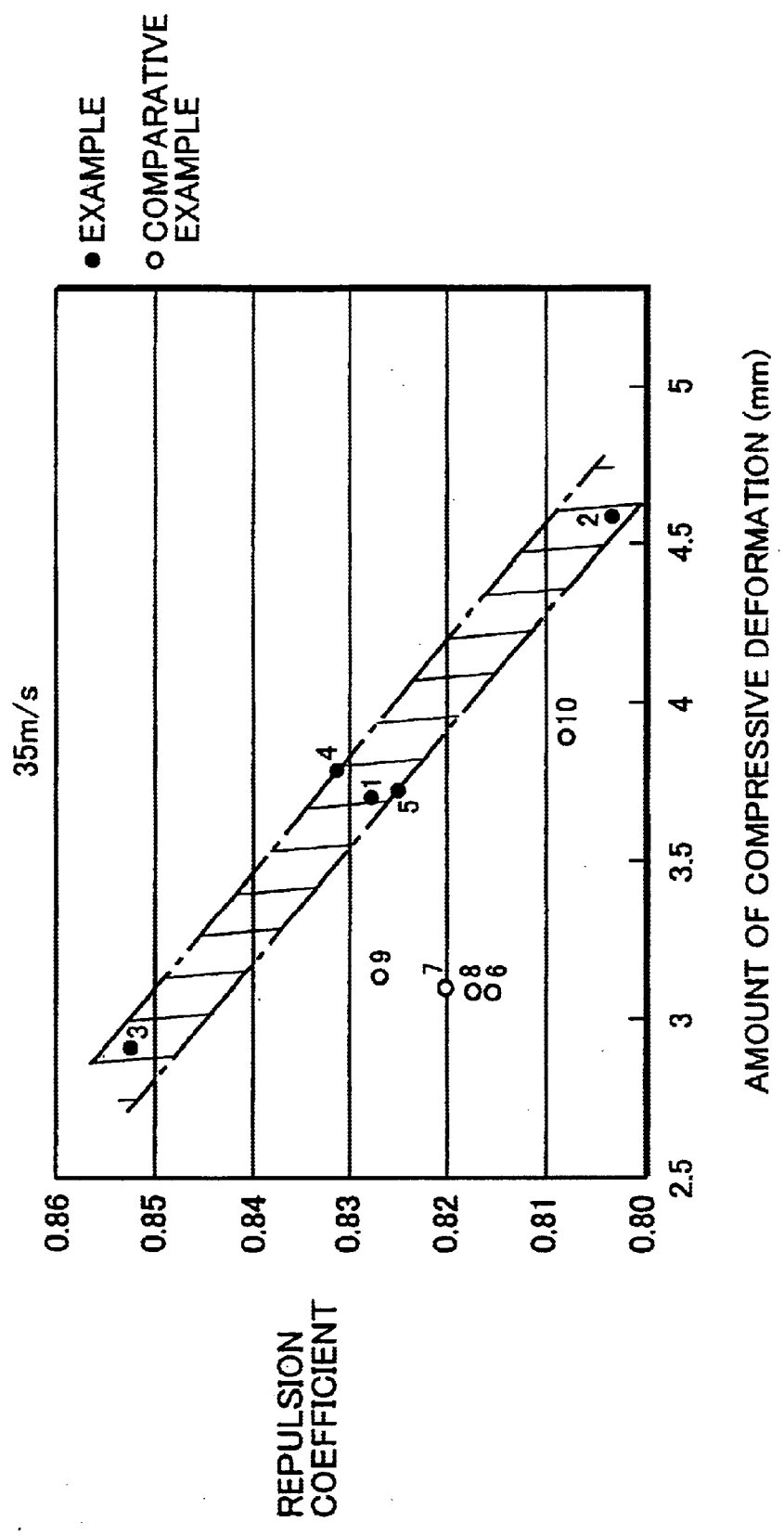
FIG. 1 is a graph representing the relationship between the compressive deformation amount and the repulsion coefficient when the golf ball is hit at the head speed of 35 m/sec.

The solid golf ball of the present invention comprises a core containing at least one layer, and a cover containing at least one layer and covering the core, wherein the at least one layer of the core is molded by vulcanizing a rubber composition comprising: (a) a base rubber, (b) a co-crosslinking agent, (c) an organic peroxide, and (d) a bromine-substituted thiophenol compound represented by the following formula, or a monovalent or divalent metal salt thereof:

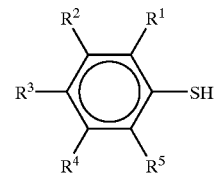

(where at least one of $R^1$ to $R^5$ is Br).

The base rubber used in the present invention includes, for example, any natural rubber and/or any synthetic rubber conventionally used for solid golf balls. Typically preferred is a so-called high cis polybutadiene rubber in which the content of cis-1,4-bond is at least 40%, preferably not less than 80%. As desired, a natural rubber, polyisoprene rubber, styrene-polybutadiene rubber, ethylene-propylene-diene rubber (EPDM), or the like may be blended with the polybutadiene rubber.

The co-crosslinking agent used in the present invention includes, for example, an $\alpha, \beta$-unsaturated carboxylic acid having 3 to 8 carbon atoms such as acrylic acid or methacrylic acid, or a monovalent or divalent metal salt thereof such as a zinc salt or a magnesium salt thereof. Among them, zinc acrylate is more preferable, because it imparts a higher repulsion property to the golf ball. The amount of the co-crosslinking agent to be blended is preferably 15 to 45 parts by mass, more preferably 20 to 35 parts by mass based on 100 parts by mass of the base rubber. If the amount of the co-crosslinking agent is more than 45 parts by mass, the resulting golf ball becomes too hard, and hence causes a poor shot feeling. If the amount is less than 15 parts by mass, the amount of the organic peroxide to be blended needs to be increased to obtain a suitable hardness, and hence a high repulsion property cannot be attained.

The organic peroxide used in the present invention serves as a crosslinking agent or a curing agent. Namely, the organic peroxide is decomposed by heat to generate radicals and enhances the degree of crosslinking between the co-crosslinking agent and the base rubber, thereby improving the repulsion property of the resulting golf ball. Examples of the organic peroxide are dicumyl peroxide, 1,1-bis(t-butylperoxy)-3,3,5-trimethylcyclohexan e, 2,5-dimethyl-2,5-di(t-butylperoxy)hexane, and di-t-butyl peroxide. Among them, dicumyl peroxide is preferable. The amount of the organic peroxide to be blended is 0.2 to 5.0 parts by mass, preferably 1.0 to 2.5 parts by mass based on 100 parts by mass of the base rubber. If the amount of the organic peroxide is less than 0.2 parts, the high repulsion property is not obtained because the core becomes too soft. If the amount is more than 5.0 parts by mass, the amount of the co-crosslinking agent to be blended needs to be decreased so as to obtain a suitable hardness, and hence it is impossible to obtain the high repulsion property and satisfactory durability.

The bromine-substituted thiophenol compound used in the present invention is represented by the following formula:

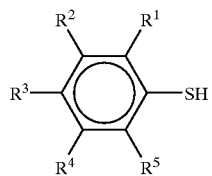

In the formula, each of $R^1$ to $R^5$ is independently H or Br, and at least one of $R^1$ to $R^5$ is Br, preferably at least three of $R^1$ to $R^5$, more preferably all of $R^1$ to $R^5$ are Br. Compared with the general thiophenol compounds, the bromine-substituted thiophenol compound imparts the excellent repulsion property, irrespective of whether the head speed is high or low. As the number of bromine atoms bonding to the benzene ring of the bromine-substituted thiophenol compound increases, it imparts a higher repulsion property to the golf ball and ensures a satisfactory repulsion property even when the golf ball is hit at the low head speed. Examples of the bromine-substituted thiophenol compound are bromothiophenol, dibromothiophenol, tribromothiophenol, tetrabromothiophenol, and pentabromothiophenol. Further, a monovalent or divalent metal salt of the above thiophenol compound can be also used in the present invention. The monovalent or divalent metal includes, for example, sodium or zinc. Examples of the metal salt of the bromine-substituted thiophenol compound are zinc bromothiophenolate, zinc dibromothiophenolate, zinc tribromothiophenolate, zinc tetrabromothiophenolate, zinc pentabromothiophenolate, and sodium pentabromothiophenolate.

The amount of the bromine-substituted thiophenol compound, or a monovalent or divalent metal salt thereof to be blended is preferably not less than 0.05 part, more preferably not less than 0.1 part, most preferably not less than 0.2 part by mass based on 100 parts by mass of the base rubber. If the amount of the bromine-substituted thiophenol compound or the metal salt thereof is less than 0.05 part by mass, it does not impart an improved repulsion property. Further, the amount of the bromine-substituted thiophenol compound or the metal salt thereof to be blended is preferably not more than 3.0 parts, more preferably not more than 2.0 parts, most preferably not more than 1.5 parts by mass based on 100 parts by mass of the base rubber. If the amount is more than 3.0 parts by mass, the compressive deformation amount of the core becomes too large, resulting in the lowered repulsion property of the golf ball. Although there is no limitation on the combination of the upper limit and the lower limit of the above amount, in view of the specific gravity of the thiophenol compounds, the amount of the bromine-substituted thiophenol compound is preferably from 0.1 to 3.0, more preferably from 0.2 to 3.0, most preferably from 0.1 to 2.0, extremely preferably from 0.1 to 1.5.

The rubber composition for use in the core of the golf ball of the present invention may further include an antioxidant, a peptizing agent, and any other component which can be usually used for preparing the core of the solid golf ball. The antioxidant is preferably used in an amount of 0.2 to 0.5 part by mass based on 100 parts by mass of the base rubber. As required, a filler may be added into the rubber composition. The filler includes, for example, a specific gravity adjusting agent mainly used to adjust the specific gravity of the golf ball obtained as a final product to the range between 1.0 and 1.5. Examples of the filler are inorganic fillers such as zinc oxide, barium sulfate, and calcium carbonate, high specific gravity metal powders, for example, tungsten powder and molybdenum powder, and mixtures thereof.

The rubber composition as described above can be kneaded homogeneously with an appropriate kneader such as a roll kneader and then molded in a mold by vulcanization to obtain the core. Although there is no particular limitation on the conditions of the molding by vulcanization, the molding by vulcanization is usually performed under the conditions of the temperature ranging from 130 to 240° C., the pressure of 2.9 to 11.8 MPa, and the molding time period of 15 to 60 minutes.

The deformation amount of the core is preferably from 2.0 to 6.0 mm, more preferably from 3.1 to 4.5 mm, most preferably from 3.5 to 4.0 mm when applying a load from 98 N as an initial load to 1275 N as a final load to the core. If the deformation amount of the core is less than 2.0 mm, the core becomes too hard, resulting in the poor shot feeling of the resulting golf ball. If the deformation amount is more than 6.0 mm, the core becomes too soft, with the result that the resulting golf ball has lowered durability and exhibits poor repulsion, hence, a shortened flight distance. Further, when the deformation amount of the core is within the range of 3.1 to 4.5 mm, preferably within the range of 3.5 to 4.0 mm, the resulting golf ball exhibits the excellent balance between the flight distance and the shot feeling.

In the present invention, the core preferably has a diameter of from 32.8 to 40.8 mm, preferably from 33.6 to 40.0 mm. If the diameter of the core is less than 32.8 mm, the repulsion property of the resulting golf ball is lowered, resulting in a short flight distance. If the diameter is more than 40.8 mm, the cover becomes too thin, with the result that the durability of the resulting golf ball is lowered.

The core used in the golf ball of the present invention contains at least one layer and may be formed of, for example, a single-layered structure or of a multi-layered structure comprising two or more layers. However, it is preferred that the core portion formed of the aforementioned rubber composition occupies 30% or greater, preferably 50% or greater, more preferably 70% or greater, most preferably 100% with respect to the whole core based on the volume. The core thus obtained is then covered with the cover.

The cover used in the golf ball of the present invention contains at least one layer and may be formed of, for example, a single-layered structure or of a multi-layered structure comprising two or more layers. A thermoplastic resin, particularly an ionomer resin which is used for the cover of the conventional golf ball, can be used as a base resin for the cover. The ionomer resin includes, for example, a copolymer of ethylene and $\alpha$, $\beta$-unsaturated carboxylic acid, of which at least a part of carboxyl groups is neutralized with metal ion, or a terpolymer of ethylene, $\alpha$, $\beta$-unsaturated carboxylic acid ester, and $\alpha$, $\beta$-unsaturated carboxylic acid, of which at least a part of the carboxyl groups is neutralized with metal ion. Examples of the $\alpha$, $\beta$-unsaturated carboxylic acids are acrylic acid, methacrylic acid, fumaric acid, maleic acid, and crotonic acid. Among them, acrylic acid and methacrylic acid are particularly preferable. Examples of the $\alpha$, $\beta$-unsaturated carboxylic acid esters are methyl ester, ethyl ester, propyl ester, n-butyl ester, isobutyl ester and the like of the above $\alpha$, $\beta$-unsaturated carboxylic acid such as acrylic acid, methacrylic acid, fumaric acid or maleic acid. Among them, acrylic ester and methacrylic ester are particularly preferable. Examples of the metal ion for neutralizing at least a part of carboxyl groups in the copolymer or the terpolymer are sodium ion, potassium ion, lithium ion, magnesium ion, calcium ion, zinc ion, barium ion, aluminum ion, tin ion, zirconium ion, and cadmium ion. Among them, sodium ion, zinc ion and magnesium ion are preferably used in view of the repulsion property, durability and the like of the resulting golf ball.

Examples of the ionomer resin are, but not limited to, HIMILAN 1555, 1557, 1605, 1652, 1702, 1705, 1706, 1707, 1855, and 1856 (produced by MITSUI-DUPONT POLYCHEMICAL CO.), SURLYN 8945, SURLYN 9945, SURLYN AD8511, SURLYN AD8512 and SURLYN AD8542 (produced by DUPONT CO.), and IOTEK 7010 and 8000 (produced by Exxon Co.). These ionomers may be used individually or as a mixture of two or more of them. Although the above ionomer resin may be used individually as a preferable material for the cover of the golf ball, in combination of the above ionomer resin, one or more kinds of thermoplastic elastomers, diene block copolymers or the like may further be used. Examples of the thermoplastic elastomer are a polyamide thermoplastic elastomer commercially available from Toray Industries, Inc. under the commercial name of "PEBAX" (for example "PEBAX 2533"), a polyester thermoplastic elastomer commercially available from DU PONT-TORAY Co.,LTD. under the commercial name of "HYTREL" (for example "HYTREL 3548" and "HYTREL 4047"), and a polyurethane thermoplastic elastomer commercially available from BASF POLYURETHANE ELASTOMERS CO. under the commercial name of "ELASTOLLAN" (for example "ELASTOLLAN ET880").

The diene block copolymer has a double bond derived from a conjugated diene compound of a block copolymer or a partially hydrogenated block copolymer. The diene block copolymer comprises a block copolymer constituting the base thereof. The block copolymer comprises polymeric block A including at least one aromatic vinyl compound as a major component and a polymeric block B including at least one conjugated diene compound as a major component. The partially hydrogenated block copolymer is obtained by hydrogenating the above block copolymer. The aromatic vinyl compound constituting the block copolymer includes, for example, styrene, $\alpha$-methylstyrene, vinyltoluene, p-t-butylstyrene, 1,1-diphenylstyrene and the like, and is preferably at least one compound selected from the group consisting of styrene, $\alpha$-methylstyrene, vinyltoluene, p-t-butylstyrene, or 1,1-diphenylstyrene. Among them, styrene is more preferable. The conjugated diene compound includes, for example, butadiene, isoprene, 1,3-pentadiene, 2,3-dimethyl-1,3-butadiene and the like, and is preferably at least one compound selected from the group consisting of butadiene, isoprene, 1,3-pentadiene, or 2,3-dimethyl-1,3-butadiene. Among them, butadiene, isoprene and a combination thereof are more preferable. The diene block copolymer is, for example, commercially available from DAICEL CHEMICAL INDUSTRIES, LTD. under the commercial name of "EPOFRIEND" (for example "EPOFRIEND A1010").

The amount of the thermoplastic elastomer, the diene block copolymer or the like to be blended is 0 to 60 parts by mass, preferably 10 to 40 parts by mass based on 100 parts by mass of the base resin used in the cover. If the amount is more than 60 parts by mass, the cover becomes too soft, resulting in the lowered repulsion property of the obtained golf ball. Further, since the compatibility with the ionomer resin is deteriorated, the durability of the resulting golf ball is likely to be lowered.

As required, the cover used in the present invention may further include the same filler as used in the core and various additives in addition to the aforementioned resins. Examples of the various additives are a pigment such as titanium dioxide, a dispersant, an antioxidant, an ultraviolet absorber, a light stabilizer and the like.

There is no particular limitation on the method for covering the core with the cover, and a conventional method can be employed therefor. Typically employed is a method including previously molding the cover composition into two hemispherical half shells, covering the core together with the two half shells, and subjecting the core with two half shells to the pressure molding at the temperature of 130 to 170° C. for 1 to 5 minutes, or a method including injection-molding the cover composition directly onto the core to cover the core.

The cover preferably has a thickness from 1.0 to 5.0 mm, more preferably from 1.4 to 4.6 mm, most preferably from 1.4 to 2.5 mm. If the thickness is smaller than 1.0 mm, the cover becomes too thin, resulting in the lowered durability and the lowered repulsion performance of the obtained golf ball. If the thickness is more than 5.0 mm, the resulting golf ball gives a poor shot feeling to the golfer.

As required, the surface of the golf ball may be formed with dimples while molding the cover, and may be paint-finished or stamped after molding the cover.

EXAMPLES

The following examples illustrate the present invention, however these examples are intended to illustrate the invention and are not to be construed to limit the scope of the invention. Many variations and modifications of such examples will exist without departing from the scope of the inventions. Such variations and modifications are intended to be within the scope of the invention.

[Measurement and Evaluation Methods]
1. Compressive Deformation Amount of the Core (mm)

The deformation amount of the core was measured when applying a load from 98N as an initial load to 1275N as a final load to the core.

2. Repulsion Coefficient of the Core

A metal cylindrical body having a weight of 198.4 g was allowed to collide with each core at the speed of 35 m/sec (low head speed) and at the speed of 50 m/sec (high head speed). The each speed of the cylindrical body and the golf ball before and after the collision was measured. The repulsion coefficient of each core was calculated based on the respective speeds measured and the respective weights of the cylindrical body and the core. The measurement was performed 12 times for each core and the averaged value was regarded as the repulsion coefficient of the core.

3. Flight Distance(Carry) (m)

A metal head wood club("XXIO" manufactured by SUMITOMO RUBBER INDUSTRIES, LTD., loft angle 12°, R shaft) was attached to a swing robot manufactured by TRUETEMPER CO. Each golf ball was hit with the metal head wood club using the swing robot at the head speed of 35 m/sec (low head speed). The flight distance of the golf ball to the point at which the golf ball fell to the ground was measured. The measurement was performed 12 times for each golf ball and the averaged value was regarded as the flight distance of the golf ball.

In turn, another metal head wood club ("XXIO TOUR-MODEL" manufactured by SUMITOMO RUBBER INDUSTRIES, LTD., loft angle 8°, X shaft) was used and attached to the swing robot in place of the metal head wood club "XXIO". Each golf ball was hit with the metal head club at the head speed of 50 m/sec (high head speed). The flight distance of the golf ball was measured in the same manner as above.

4. Shot Feeling

The actual hitting test was carried out by a group of ten golfers whose head speeds were as low as about 35 m/sec. and another group of ten golfers whose head speeds were as high as about 50 m/sec. using a wood club #1 (driver, W#1, manufactured by SUMITOMO RUBBER INDUSTRIES, LTD.). The shot feeling of each golf ball was evaluated in terms of the magnitude of the impact of the shot based on the following criteria. The largest number of the criteria level was determined as the result of the evaluation for the golf ball.

Criteria:

"Excellent": The impact of the shot was very small;
"Good": The impact of the shot was small;
"Fair": The impact of the shot was not large but in an ordinary level.
"Poor": The impact of the shot was large.

[Manufacture of the Golf Ball]

The materials for the cover composition shown in Table 1 were mixed using a twin-screw mixing extruder to prepare the cover composition in a pellet form in the following conditions:

screw diameter=45 mm,
screw revolutions=200 rpm, and
screw L/D=35.

The mixture was heated to 200–260° C. at the die portion of the extruder.

TABLE 1

| Materials for Cover Composition | Amounts (parts by mass) |
|---|---|
| HIMILAN 1706*[1] | 30 |
| HIMILAN 1707*[2] | 30 |
| HIMILAN 1605*[3] | 40 |
| Titanium dioxide | 2 |
| Barium sulfate | 2 |

*[1]HIMILAN 1706 is an ionomer resin of a zinc ion-neutralized ethylene-methacrylic acid copolymer, available from MITSUI-DUPONT POLYCHEMICAL CO., LTD.
*[2]HIMILAN 1707 is an ionomer resin of a sodium ion-neutralized ethylene-methacrylic acid copolymer, available from MITSUI-DUPONT POLYCHEMICAL CO., LTD.
*[3]HIMILAN 1605 is an ionomer resin of a sodium ion-neutralized ethylene-methacrylic acid copolymer, available from MITSUI-DUPONT POLYCHEMICAL CO., LTD.

The rubber compositions for the core shown in Table 2 were kneaded with a roll kneader, and then pressed in a mold at the elevated temperature 160° C. for 30 minutes to obtain cores Nos. 1 to 10 each having a diameter of 38.4 mm. The compressive deformation amount and the repulsion coefficient of the obtained cores were measured. Subsequently, the cores were each covered with a pair of hemispherical half shells (cover thickness: 1.9 mm) previously prepared from the cover composition, and then coated with a paint to obtain golf balls Nos. 1 to 10 each having a diameter of 42.8 mm. Golf balls Nos. 1 to 5 are examples of the present invention, while golf balls Nos. 6 to 10 are comparative examples. The obtained golf balls were evaluated in terms of the flight distance and the shot feeling according to the foregoing measurement and evaluation methods.

As to the shot feeling, golf balls Nos. 1, 5 and 9 were evaluated at the head speed of 35 m/sec, and golf balls Nos. 1, 5 and 8 were evaluated at the head speed of 50 m/sec. The results were also shown in Table 2. The relationships between the compressive deformation amount(X-axis) and the repulsion coefficient (Y-axis) of each core were shown in FIG. 1 (Head Speed:35 m/sec) and FIG. 2 (Head Speed:50 m/sec). The butadiene rubber used in the rubber composition for each core was a high cis-polybutadiene rubber (BR-11) produced by The Japan Steel Works, LTD.

TABLE 2

| Golf balls | No. 1 | No. 2 | No. 3 | No. 4 | No. 5 | No. 6 | No. 7 | No. 8 | No. 9 | No. 10 |
|---|---|---|---|---|---|---|---|---|---|---|
| Core composiiton (parts) | — | — | — | — | — | — | — | — | — | — |
| BR-11 | 100 | 100 | 100 | 100 | 100 | 100 | 100 | 100 | 100 | 100 |
| Zinc acrylate | 30 | 15 | 45 | 30 | 30 | 30 | 30 | 30 | 30 | 15 |
| Zinc oxide | 20 | 25.4 | 14.6 | 20 | 20 | 20 | 20 | 20 | 20 | 25.4 |
| Dicumyl peroxide | 0.5 | 0.5 | 0.5 | 0.5 | 0.5 | 0.5 | 0.5 | 0.5 | 0.5 | 0.5 |
| Pentabromothiophenol | 0.5 | 1.0 | 3.0 | — | — | — | — | — | — | — |
| Zinc pentabromothiophenol | — | — | — | 1.0 | — | — | — | — | — | — |
| 2,4,6-tribromothiophenol | — | — | — | — | 1.0 | — | — | — | — | — |
| Thiophenol | — | — | — | — | — | — | — | 0.5 | — | — |
| 4-t-butyl-thiohenol | — | — | — | — | — | — | — | — | 0.5 | 1.0 |

TABLE 2-continued

| Golf balls | No. 1 | No. 2 | No. 3 | No. 4 | No. 5 | No. 6 | No. 7 | No. 8 | No. 9 | No. 10 |
|---|---|---|---|---|---|---|---|---|---|---|
| 2-benzamide thiophenol | — | — | — | — | — | — | 0.5 | — | — | — |
| Core Deformation (mm) | 3.73 | 4.60 | 2.98 | 3.80 | 3.74 | 3.10 | 3.11 | 3.10 | 3.15 | 3.91 |
| Golf ball Property | — | — | — | — | — | — | — | — | — | — |
| Low head speed (35 m/s) | — | — | — | — | — | — | — | — | — | — |
| Repulsion Property | 0.828 | 0.803 | 0.852 | 0.832 | 0.825 | 0.815 | 0.820 | 0.815 | 0.827 | 0.808 |
| Flight distance (m) | 162 | 157 | 167 | 163 | 161 | 159 | 160 | 160 | 162 | 158 |
| Shot feeling | Excellent | — | — | — | Excellent | — | — | — | Poor | — |
| High head speed (50 m/s) | — | — | — | — | — | — | — | — | — | — |
| Repulsion Property | 0.740 | 0.716 | 0.763 | 0.743 | 0.736 | 0.737 | 0.742 | 0.738 | 0.750 | 0.727 |
| Flight distance (m) | 250 | 243 | 257 | 251 | 247 | 248 | 250 | 248 | 252 | 245 |
| Shot feeling | Excellent | — | — | — | Excellent | — | — | Poor | — | — |

In FIGS. 1 and 2, toward the right-side along the X-axis, the compressive deformation amount of the golf ball increases and hence the impact upon the shot becomes smaller. Namely, the larger compressive deformation amount indicates that the golf ball imparts a better shot feeling to the golfer. On the other hand, toward the up-side along the Y-axis in the figures, the repulsion coefficient of the golf ball increases, and hence the golf ball exhibits a longer flight distance. Namely, the plot of a golf ball in the upper-right side in the graph means that the golf ball becomes more excellent in both the repulsion property and the shot feeling. Generally, the repulsion coefficient decreases as the compressive deformation amount is increasing, and conversely the repulsion coefficient increases as the compressive deformation amount is decreasing. Therefore, the compressive deformation amount and the repulsion coefficient of the golf ball using bromine-substituted thiophenol compound fall within the hatched range defined between one-dot chain lines.

As can be understood from the comparison among golf balls Nos. 6 to 9 in Table 2, golf balls Nos. 7 to 9 each containing a thiophenol compound were superior to a golf ball which does not contain thiophenol (No.6) in the repulsion property (carry) both at the low and high head speed. As seen from FIG. 2 in the case of the head speed of 50 m/s, the plots of golf balls Nos. 9 and 10 are located close to the range defined between the one-dot chain lines of the present invention, and hence their repulsion property and shot feeling were made relatively compatible with each other. However, as seen from FIG. 1 in the case of the head speed of 35 m/s, the plots of all golf balls Nos. 6 to 10 are located below the range defined between the one-dot chain lines in FIG. 1, and hence their repulsion property and shot feeling were made less compatible with each other than those of golf balls Nos. 1 to 5. Although golf balls Nos. 1, 5 and 9 exhibited substantially equal repulsion coefficients at the head speed of 35 m/sec, the respective compressive deformation amounts of the golf balls Nos. 1 and 5 each using a bromine-substituted thiophenol were 3.73 mm (No. 1) and 3.74 mm (No. 5), which were larger than 3.15 mm of the golf ball No. 9 using the thiophenol compound having a substituent group other than bromo group. This means that the use of the bromine-substituted thiophenol makes it possible to increase the compressive deformation amount and improve the shot feeling while ensuring substantially the same degree of the repulsion property.

As seen from Table 2, at the low head speed, although golf balls Nos. 1, 5 and 9 exhibited substantially equal flight distances, the shot feeling was poor in only the golf ball No. 9 using the thiophenol compound having the substituent group other than bromo group. Further, at the high head speed, although golf balls Nos. 1, 5 and 8 exhibited substantially equal flight distances, the shot feeling was also inferior in only the golf ball No. 8 using the thiophenol compound having a substituent group other than bromo group.

As can be understood from the comparison among golf balls Nos. 1, 4 and 5, although the compressive deformation amounts thereof were substantially equal, their repulsion coefficient (flight distance) were larger in the order of zinc pentabromo thiophenol, pentabromo thiophenol and 2,4,6-tribromo thiophenol. This result indicated that the repulsion property becomes better as the number of substituting Br atoms increases. The present invention is configured as described above and characterized in that a bromine-substituted thiophenol wherein at least one hydrogen atom of the phenyl group is substituted with bromine atom is used for the core rubber composition, thus provides the solid golf ball which ensures superior repulsion property and flight distance while maintaining a good shot feeling irrespective of whether the golf ball is hit at the high head speed or the low head speed.

This application is based on Japanese Application Serial No. 2001-147712 filed in Japan Patent Office on May 17, 2001, the contents of which are hereby incorporated by reference.

What is claimed is:

1. A solid golf ball comprising
   a core containing at least one layer, and
   a cover containing at least one layer and covering the core,
   wherein the at least one layer of the core is molded by vulcanizing a rubber composition including:
   (a) a base rubber,
   (b) a co-crosslinking agent,
   (c) an organic peroxide, and
   (d) a bromine-substituted thiophenol compound represented by the following formula, or a monovalent or divalent metal salt thereof:

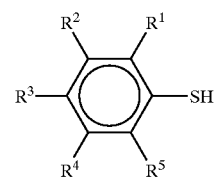

wherein $R^1$ to $R^5$ represent Br or hydrogen, and at least three of $R^1$ to $R^5$ is Br.

2. The solid golf ball according to claim 1, wherein the cover is made from a thermoplastics resin.

3. The solid golf ball according to claim 1, wherein the metal is sodium or zinc.

4. The solid golf ball according to claim 1, wherein the rubber composition for the core comprises 0.05 to 3 parts by mass of the bromine-substituted thiophenol compound, or a monovalent or divalent metal salt thereof, 15 to 45 parts by mass of the co-crosslinking agent, and 0.2 to 5 parts by mass of the organic peroxide based on 100 parts by mass of the base rubber.

5. The solid golf ball according to claim 1, wherein the base rubber is a polybutadiene rubber in which the content of cis-1,4-bond in not less than 40%.

6. The solid golf ball according to claim 1, wherein the deformation amount of the core is 2.0 to 6.0 mm when applying a load from 98 N as an initial load to 1275 N as a final load to the core.

7. The solid golf ball according to claim 6, wherein the deformation amount of the core is 3.1 to 4.5 mm when applying a load from 98 N as an initial load to 1275 N as a final load to the core.

8. The solid golf ball according to claim 7, wherein the core has a diameter from 32.8 mm to 40.8 mm.

9. A solid golf ball comprising
a core containing at least one layer, and
a cover containing at least one layer and covering the core,
wherein the at least one layer of the core is molded by vulcanizing a rubber composition including:
(a) 100 parts of a high cis-polybutadiene rubber,
(b) 15 to 45 parts of a co-crosslinking agent,
(c) 0.2 to 5 parts of an organic peroxide, and
(d) 0.1 to 2 parts of a bromine-substituted thiophenol compound represented by the following formula, or a monovalent or divalent metal salt thereof based on mass:

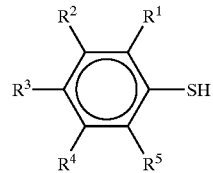

wherein $R^1$ to $R^5$ represent Br or hydrogen, and at least three of $R^1$ to $R^5$ is Br.

10. The solid golf ball according to claim 9, wherein the metal is sodium or zinc.

11. The solid golf ball according to claim 10, wherein the high cis-polybutadiene rubber is a polybutadiene rubber in which the content of cis-1,4-bond in not less than 80%.

12. The solid golf ball according to claim 11, wherein the cover is made from an ionomer resin.

13. The solid golf ball according to claim 12, wherein the deformation amount of the core is 2.0 to 6.0 mm when applying a load from 98 N as an initial load to 1275 N as a final load to the core.

14. The solid golf ball according to claim 13, wherein the deformation amount of the core is 3.1 to 4.5 mm when applying a load from 98 N as an initial load to 1275 N as a final load to the core.

15. The solid golf ball according to claim 14, wherein the core has a diameter from 32.8 mm to 40.8 mm.

* * * * *